J. H. KNOWLES.
WEFT-FORK.

No. 182,026. Patented Sept. 12, 1876.

Witnesses
S. N. Piper
L. W. Möller

Jacob H. Knowles.
by his attorney.
R. H. Eddy

UNITED STATES PATENT OFFICE.

JACOB H. KNOWLES, OF LAWRENCE, MASSACHUSETTS.

IMPROVEMENT IN WEFT-FORKS.

Specification forming part of Letters Patent No. 182,026, dated September 12, 1876; application filed August 16, 1876.

*To all whom it may concern:*

Be it known that I, JACOB H. KNOWLES, of Lawrence, of the county of Essex and State of Massachusetts, have invented a new and useful Improvement in Loom Filling-Forks; and do hereby declare the same to be fully described in the following specification, and represented in the accompanying drawings, of which—

Figure 1:
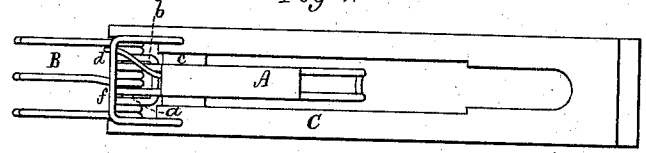
Figure 2:
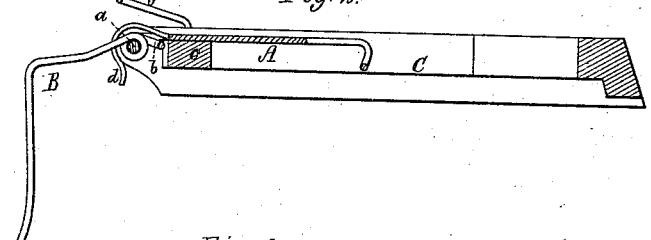

Figure 1 is a top view, and Fig. 2 a longitudinal section, of a loom filling-fork and slide embodying my invention, which consists, first, in a filling-fork having its shank and series of tines in separate parts, hinged together, and provided with a hinge-stop, all being to operate substantially as hereinafter specified; second, in the combination of such a filling-fork and a stop projecting from the shank, and being to arrest the upward movement of such shank; third, in the combination of such a filling-fork with a stop projecting from the slide, and serving to arrest the series of tines in order to prevent them from being thrown upward and back upon the slide.

The object of constructing the filling-fork with its shank and series of tines in separate parts, hinged together, and provided with a hinge-stop to determine the extent of fall of the said series of tines relatively to the shank, is to enable the tines to move outwardly or upward, when caught upon a shuttle, without resistance from the shank and its rest.

When the shank and tines are rigidly connected, and the latter become caught upon a shuttle, while the lay may be in movement and the shank be upon its rest, breakage of the tines from the shank, or bending them out of their normal positions, necessarily follow. My invention serves to prevent such an accident.

In the drawings, A denotes the shank, B the set of tines, and C their supporting-slide.

Figure 3:
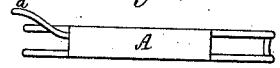
Figure 4:
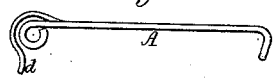
Figure 5:
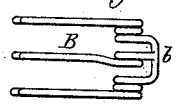
Figure 6:
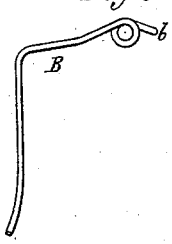

Figure 3 is a top view, and Fig. 4 an edge view, of the shank. Fig. 5 is a top view, and Fig. 6 an edge view, of the set of tines.

The shank and set of tines are represented as made of wire, and working on or applied to a common fulcrum or joint pin, $a$, extending through the slide. The set of tines is also shown as furnished with the short shank or hinge-stop $b$, to bring up against the shank when it and the tines are in their working positions, and the shank is upon its rest $c$. The shank is also shown as furnished with a projection or stop, $d$, extending from it, so as to bring up against the rest $c$ when the shank is in its elevated position, the object of the stop $d$ being to prevent the shank from being thrown up too high and falling forward. The back-stop of the set of tines is shown at $f$, as a bent or bowed wire, inserted at its ends in the slide, and projecting therefrom, as represented. It prevents the tines from being thrown over upon the shank. This back-stop may answer as an up-stop for the shank, as well as one for the tines, in which case the stop $d$ may be dispensed with.

I do not confine the set of tines to the precise construction of the hinge-stop $b$, as shown, as it may be otherwise made.

What I claim as my invention or improvements is as follows, viz:

1. The filling-fork having its shank A and series B of tines in separate parts, hinged together, and provided with a hinge-stop, $b$, all being to operate substantially as described.

2. The combination of the stop $d$, projecting from the shank A, with the supporting-slide C, and with the filling-fork, having its shank A and set B of prongs or tines in separate parts, hinged together, and provided with a hinge-stop, $b$, as set forth.

3. The combination of the back-stop $f$, projecting from the slide C, with such slide, and with the filling-fork, having its shank A and set B of prongs hinged together and provided with the stop $b$, all being essentially as shown and described.

JACOB H. KNOWLES.

Witnesses:
R. H. EDDY,
J. R. SNOW.